(12) United States Patent
Haberer et al.

(10) Patent No.: US 7,623,031 B2
(45) Date of Patent: Nov. 24, 2009

(54) METHOD AND APPARATUS FOR THE CONTROL OF A SAFETY-RELEVANT FUNCTION OF A MACHINE

(75) Inventors: Manfred Haberer, Riegel (DE); Bernd Rothenberger, Breisach-Oberrimsingen (DE); Carsten Natzkowski, Freiburg (DE)

(73) Assignee: Sick AG., Waldkirch/Breisgau (DE)

( * ) Notice: Subject to any disclaimer, the term of this patent is extended or adjusted under 35 U.S.C. 154(b) by 960 days.

(21) Appl. No.: 11/212,935

(22) Filed: Aug. 25, 2005

(65) Prior Publication Data

US 2006/0049939 A1    Mar. 9, 2006

(30) Foreign Application Priority Data

Sep. 8, 2004    (DE) .................. 10 2004 043 514

(51) Int. Cl.
    *G08B 13/00*    (2006.01)
(52) U.S. Cl. ................. 340/541; 340/540; 340/579; 340/680; 340/686.1
(58) Field of Classification Search ............. 340/541, 340/540, 556, 561, 562, 679, 680, 686.1, 340/573.1, 648; 72/21.3; 192/130, 129 A, 192/131 R; 250/221; 382/103
See application file for complete search history.

(56) References Cited

U.S. PATENT DOCUMENTS

| | | | |
|---|---|---|---|
| 6,778,092 B2 * | 8/2004 | Braune ..................... 340/679 |
| 7,049,967 B2 * | 5/2006 | Grasselli et al. .......... 340/573.1 |
| 7,080,534 B2 * | 7/2006 | Schneiderheinze .......... 72/21.3 |
| 7,391,178 B2 * | 6/2008 | Tanaka et al. ............. 318/568.2 |
| 7,412,861 B2 * | 8/2008 | Lohmann ................. 72/31.1 |
| 7,448,241 B2 * | 11/2008 | Davies ........................ 72/1 |
| 2003/0024421 A1 | 2/2003 | Braune et al. |

FOREIGN PATENT DOCUMENTS

| | | |
|---|---|---|
| DE | 101 52 543 A1 | 5/2003 |
| DE | 10152543 A1 | 5/2003 |
| DE | 10245720 | 4/2004 |
| EP | 1 267 234 A2 | 12/2002 |
| JP | 08108383 A | 4/1996 |
| WO | WO2004/042269 A1 | 5/2004 |

OTHER PUBLICATIONS

Automation, Som, Franz, Roboteranlagen ohne trennende Schutzeinrichtungen, Sep. 25, 2002, pp. 22 and 23 in German.
Elektronik Net, Trennung aufgehoben, Druckversion Fachwissen, Apr. 30, 2003, in German.

* cited by examiner

*Primary Examiner*—Davetta W Goins
(74) *Attorney, Agent, or Firm*—Harness, Dickey & Pierce, P.L.C.

(57) ABSTRACT

An apparatus for the control of at least one safety-relevant function of a machine is described having a machine control for the control of the movements of the machine, having at least one sensor for the sensing of an object inside a monitored zone and having an evaluation unit for the setting of a danger zone and for the triggering of the safety-relevant function on the intrusion of the sensed object into the danger zone. To set the danger zone, the evaluation unit is coupled to the machine control and the evaluation unit is designed for the derivation of the parameters required for the setting of the danger zone starting from the control signals used by the machine control for the movement control of the machine. A corresponding method is furthermore described.

22 Claims, 8 Drawing Sheets

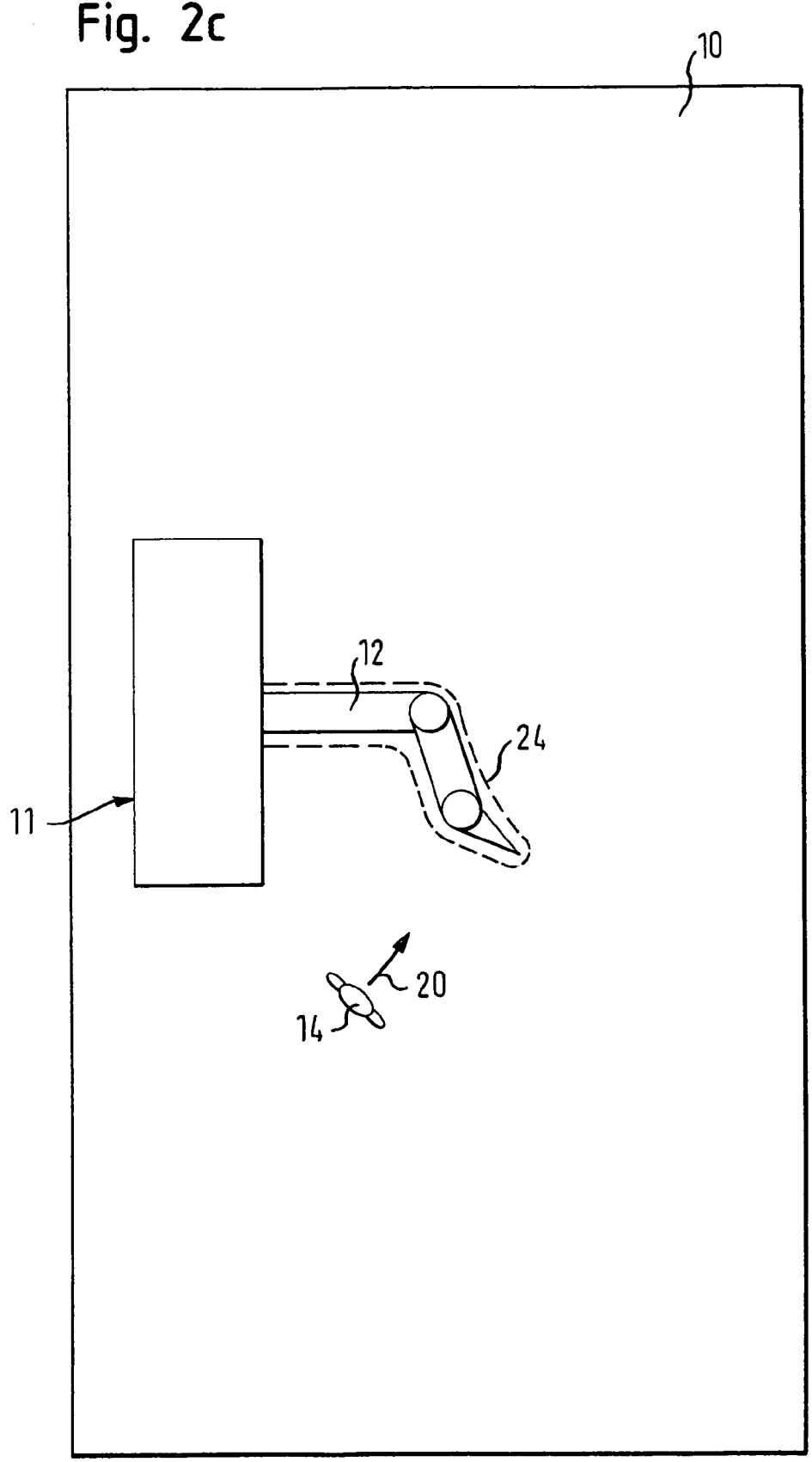

METHOD AND APPARATUS FOR THE CONTROL OF A SAFETY-RELEVANT FUNCTION OF A MACHINE

CROSS-REFERENCE TO RELATED APPLICATIONS

This application claims the benefit of German Patent Application No. DE 10 2004 043 514.6, filed on Sep. 8, 2004. The disclosure of the above application is incorporated herein by reference.

FIELD AND BACKGROUND OF THE INVENTION

The present invention relates to an apparatus for the control of at least one safety-relevant function of a machine having a machine control for the control of the movement of the machine, having at least one sensor for the sensing of an object inside a monitored zone and having an evaluation unit for the setting of a danger zone and for the triggering of the safety-relevant function on the intrusion of the sensed object into the danger zone. The invention is furthermore directed to a method for using an apparatus of this type.

An apparatus and a method of this type are known from DE 101 52 543 A2. In accordance with this reference, a safety-relevant function of a machine is triggered when an object sensed by the sensor intrudes into the danger zone of a machine. The danger zone can be fixed dynamically in dependence on the position, on the speed of movement and/or on the direction of movement of the person. The machine can furthermore also be monitored in a corresponding manner via the sensor.

While this apparatus has generally proven itself, very fast movements of the machine can in particular result in problems. Before the evaluation unit can transmit a possibly necessary stop signal to the machine control in this case, the sensor must first measure the position and possibly also the speed of the machine and transmit these data to the evaluation unit. The time the sensor needs for the measurement has the result with the known apparatus that, at high machine speeds, the danger zone must be dimensioned very generously to ensure sufficient safety for the object. A further disadvantage of the known apparatus is that the machine has to be recognized error-free by the sensor to be able to ensure the required safety since the setting of the danger zone takes place in dependence on the machine data sensed by the sensor.

SUMMARY OF THE INVENTION

It is an object of the present invention to develop an apparatus and a method of the initially named kind such that a triggering of the safety-relevant function is also ensured with fast machine movements. Furthermore, a reliable representation of the machine data such as the position, speed or direction of movement should be possible.

The object relating to the apparatus is satisfied, starting from an apparatus of the initially named kind, in that the evaluation unit is coupled to the machine control for the setting of the danger zone and in that the evaluation unit is designed for the derivation of the parameters required for the setting of the danger zone from the control signals used by the machine control for the movement control of the machine.

The object relating to the method is satisfied, starting from a method of the initially named kind, in that the evaluation unit is coupled to the machine control to fix the danger zone and in that the evaluation unit derives the parameters required for this from the control signals used by the machine control for the movement control of the machine.

The method in accordance with the invention and the apparatus presented permit the direct communication between the machine control and the evaluation unit for the setting of the danger zone. It is no longer necessary, as customary in the prior art, to communicate via the sensor, but the machine control rather delivers the data relating to the machine directly to the evaluation unit, which both effects a time saving in the evaluation of dangerous situations and allows a more precise setting of the danger zone. Danger zones defined more tightly than before or higher machine speeds can thereby be allowed without reducing the required safety.

In accordance with an advantageous embodiment, the evaluation unit is not only coupled to the machine control, but also to the sensor, for the setting of the danger zone. The danger one can thereby not only be set on the basis of the machine data, but pre-determined data of the object can additionally be used for the setting of the danger zone. If a fast-moving object is sensed by the sensor, the danger zone can, for example, be selected to be larger than with a slowly moving object. The size of the standard danger zone, as is selected with slow-moving objects, can therefore be minimized without compromises in safety, since the movement of a fast-moving object is taken into account individually.

In accordance with a further preferred embodiment of the invention, the sensor is spatially resolving and/or time resolving and the evaluation unit is designed for the determination of the position, of the direction of movement and/or of the speed of movement of the object. If the direction of movement of the object is also determined in addition to the position, the danger zone can be matched to the individual movements of the object. The danger zone can e.g. be selected to be larger in this case when the object is approaching the machine and smaller when the object is moving away from the machine. All these options serve to define the danger zone as small as possible, but also as large as necessary.

In accordance with a further advantageous embodiment of the invention, the machine control is designed for the transmission of the position and/or of the direction of movement and/or the speed of movement of the machine to the evaluation unit. Analog to the prior explanations, the direct sensing of the machine speed can also be converted into a minimization of the danger zone with slow machine movements and into the expansion of the danger zone with fast machine movements. The same applies to the direct sensing of the direction of movement of the machine which can be converted into a corresponding shape and size of the danger zone. A slow-moving machine will not put the object at risk to the same degree as a fast-moving machine. The detection of the direction of movement is likewise of advantage since a protected zone only has to be defined in the corresponding danger direction. Objects can thereby stay close to the machine without hindrance when the machine moves away from the object, whereas with the same distance between the object and the machine, the latter is switched off, for example, when the machine moves in the direction of the object. This embodiment therefore permits a maximum utilization of the working zone by the objects and a minimum delineation of a zone of this working zone as a danger zone.

In accordance with a further preferred embodiment, the machine control is designed for the transmission of the future position, in particular the directly future position, and/or of the direction of movement and/or the speed of movement of the machine to the evaluation unit. If the evaluation unit is already informed of the future movement and/or speed and/or position of the machine in advance, this can be taken into account in the definition of the danger zone so that the latter can be matched to danger situations to be expected. This can take place, for example, by evaluation of future program steps of the control program of the machine. A machine which is admittedly in the idle state, but which should be brought to a high speed in a short time, accordingly has a larger danger zone associated with it, whereas a machine which is in the idle state and also remains there can be considered as not hazardous. The future direction of movement can also flow into the setting of the danger zone. A movement of the machine presenting hazards can in particular be suppressed from the start by an evaluation of the future direction of movement in that the danger zone is increased in the direction of the future movement. If the machine is, for example, at a standstill, it can be prevented that the machine starts up at all when an object is located inside the future danger zone by an evaluation of the future direction of movement and/or speed of movement and by setting a corresponding danger zone before starting up the machine.

In accordance with a further preferred embodiment of the invention, the extent of the danger zone when the machine is at standstill is equal to zero. This is made possible by the information of the evaluation unit on the future behavior of the machine. If the machine is to be started up again after the standstill, a danger zone is set in the direction of this movement and a check is made for intrusion of an object; if it should remain at a standstill, however, the danger zone can remain at equal to zero. This embodiment is in particular of decisive importance when an operating person has to work directly with the machine. Maintenance work can equally be carried out on the machine without the whole machine having to be shut down.

In accordance with a further preferred embodiment, the slowing down and/or the stopping of the machine is defined as one of the safety-relevant functions. Maximum safety is generally achieved when the machine is brought to a stop as fast as possible on the intrusion of an object into the danger zone. In some cases, however, a slowing down of the speed of movement of the machine can also be sufficient. Depending on the information on the direction of movement and/or on the speed of movement of the object and/or of the machine available to the evaluation unit, either a reduction of the speed of movement or the complete stopping of the machine can therefore be selected. In comparison with a machine programmed only to stop, this has the advantage that a machine stop is really only triggered in necessary cases, whereas a slowing down of the machine motion is sufficient in less urgent cases. It is ensured in this manner that the production process is not impeded unnecessarily.

The evasive action of the machine with respect to the object can preferably be defined as one of the safety-relevant functions. An evasive action of the machine can frequently be safer than the slowing down or stopping of the machine since a stopping can be achieved less fast than an evasive motion under certain circumstances due to the inertia of the machine. It is, however, necessary for this purpose to have information on the direction of movement and the speed of movement of the object available so that the evasive motion takes place in the right direction. It is thereby furthermore also ensured that the production process is not interrupted unnecessarily.

In a further advantageous embodiment of the invention, the emission of an acoustic and/or visual warning signal is defined as one of the safety-relevant functions. This has the particular advantage that the working procedure of the machine is not interrupted and simultaneously an effective warning is emitted with respect to intruding objects, in particular persons. A combination of the warning signal with one or more of the aforesaid safety-relevant functions is particularly advantageous. Danger zones of different degrees can in particular be defined in this process. If an object intrudes into a zone of a first degree, that is of a relatively low risk, an acoustic or visual signal is triggered which does not yet interrupt the work flow of the machine. If, however, the object intrudes into the danger zone of the second degree, the machine either evades the object or its movement is slowed down and it is possibly stopped completely.

A plurality of objects can preferably be monitored by the at least one sensor. An individual sensor can be designed for the simultaneous monitoring of a plurality of objects. A plurality of sensors can, however, also be provided of which each is designed either for the monitoring of one and/or one or more objects. This is particularly advantageous when the zone to be monitored lies in the working space of a plurality of persons since in this case the greatest possible safety for all persons has to be ensured.

In accordance with a further preferred embodiment of the invention, a classification of the objects entering into the monitored zone in particular takes place by the evaluation unit into objects belonging to the machine and objects not belonging to the machine. This is necessary when the machine is arranged such that it is likewise sensed by the sensors. Since the machine is by definition always arranged inside the danger zone, a self-triggering of the safety-relevant functions by the machine would take place without the recited classification. In accordance with the invention, the machine position data received directly by the machine control can be compared with the position data sensed by the sensor so that the recited classification can be achieved in this manner. The "object data" sensed as belonging to the machine can then remain out of consideration on the checking of the danger zone. Generally, a use of an infrared sensor which only reacts to the heat radiation of persons is, for example, also possible for the classification.

A classification is superfluous if the machine is arranged such that it cannot be sensed by the sensor at least inside the monitored zone. This can be achieved, for example, by use of an area sensor arranged such that the working zone of the machine lies outside the sampling zone of the area sensor. The area sensor must naturally still be arranged such that objects intruding into the monitored zone are reliably sensed.

Further advantageous embodiments of the invention are recited in the dependent claims.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 2a-2c are schematic plan views of the apparatus in accordance with FIG. 1 during different worksteps.

DETAILED DESCRIPTION OF THE PREFERRED EMBODIMENTS

The following description of the preferred embodiment(s) is merely exemplary in nature and is in no way intended to limit the invention, its application, or uses.

Figure 1:
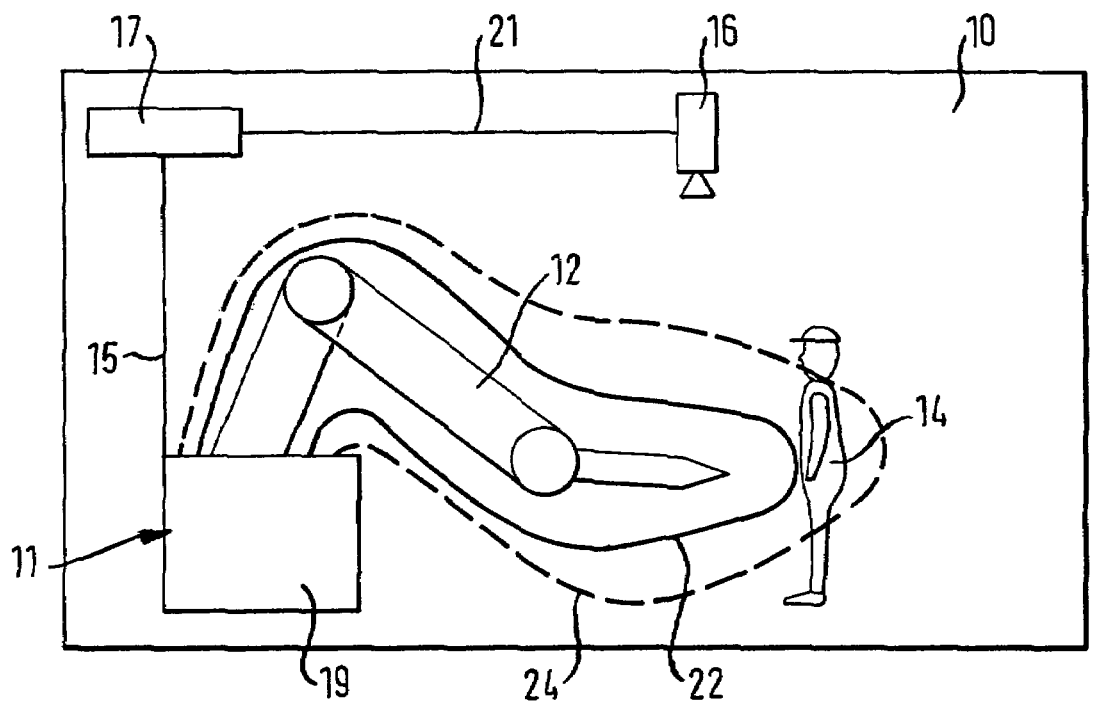
FIG. 1 is a schematic side view of an apparatus designed in accordance with the invention.

FIGS. 1 and 2 show an apparatus for the control of a safety-relevant function of a machine 11 designed as a robot comprising a movable robot arm 12. The machine 11 comprises a machine control 19 which is connected to an evaluation unit 17 via a lead 18 for the bidirectional transmission of data. A wireless connection can generally also be provided instead of the lead 18.

The evaluation unit 17 is connected via a further lead 21 to a sensor 16 designed as a monitoring camera, with a wireless connection generally also being conceivable here. Instead of being designed as a camera, the sensor can also be designed as any other spatially resolving sensor and/or time resolving sensor, for example as a laser scanner, in particular as an area sensor.

The sensor 16 is arranged above the machine 11 such that it monitors a monitored zone 10 (see FIG. 2) which includes the working zone of the machine 11 within which the robot arm 12 moves and a zone adjacent thereto. A person 14 (object) is located inside the monitored zone 10 and is sensed by the sensor 16, with data being transmitted to the evaluation unit 17 on the position, direction of movement and/or direction of speed of the person 14 via the lead 21.

Furthermore, a danger zone 22 can be recognized from FIGS. 1 and 2 which is set by the evaluation unit 17. The danger zone 22 characterizes that zone of the monitored zone 10 on whose breach by an object 14 a safety-relevant function has to be triggered. For example, the machine 11 can be switched off on an intrusion of the person 14 into the danger zone 22.

In accordance with the invention, the size and shape of the danger zone 22 is set by the evaluation unit 17 on the basis of the data obtained directly from the machine control 19 via the lead 18—for example the position, speed of movement and direction of movement of the robot arm 12. The danger zone 22 can thereby be minimized as shown in FIGS. 1 and 2. At the same time, the data on the person 14 such as his position, speed of movement and direction of movement sensed by the sensor 16 or derived therefrom are likewise used to set the danger zone 22. The danger zone 22 can be set dynamically, i.e. with the robot arm 12 moving along, or also statically.

In the situation shown in FIG. 1, no safety-relevant function is triggered since the person 14 is still just outside the minimized danger zone 22. This minimized formation of the danger zone 22 is achieved, as already mentioned, by the direct coupling of the evaluation unit 17 and the machine control 19.

Without this coupling, the danger zone would have to be set substantially larger since, in this case, the parameters required for the setting of the danger zone would have to be determined on the basis of the data determined by the sensor. In this case, as a result of the associated time delay, due to the required measurement time of the sensor 16 and to any possible sensing imprecision, the danger zone would have to be set with larger safety tolerances. A second danger zone 24 corresponding to this prior art is indicated by a broken line in FIG. 1. In accordance with FIG. 1, the person 14 would be arranged inside the danger zone 24 such that the machine 11 would, for example, be switched off, which is avoided with the minimized danger zone 22 in accordance with the invention.

Figure 2A:
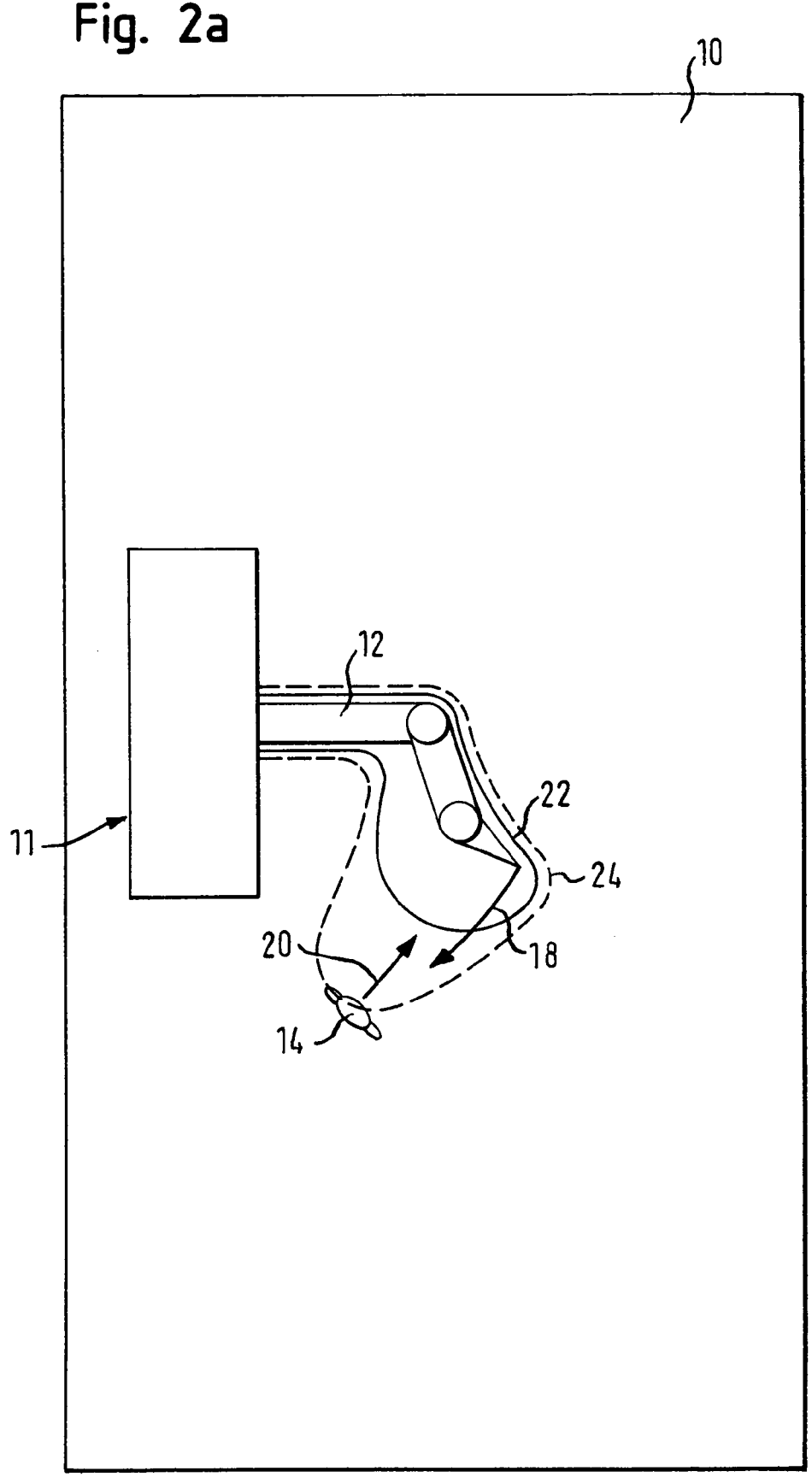

In FIGS. 2a) to 2c), the respective speeds are shown in magnitude and direction, i.e. the speed vectors of the robot arm 12 and of the person 14, by arrows 18 and 20.

FIGS. 2a) to 2c) show a further difference in the determination of the danger zone on a direct coupling of the machine control 19 to the evaluation unit 17 in contrast to an indirect coupling via measurements of the sensor 16.

In FIG. 2a), the danger zone 22 in accordance with the invention set on the basis of the relative speed between the person 14 and the robot arm 12 is just large enough that no safety-relevant function is triggered, whereas with a danger zone 24 in accordance with the prior art, a safety-relevant function would be triggered.

Figure 2B:
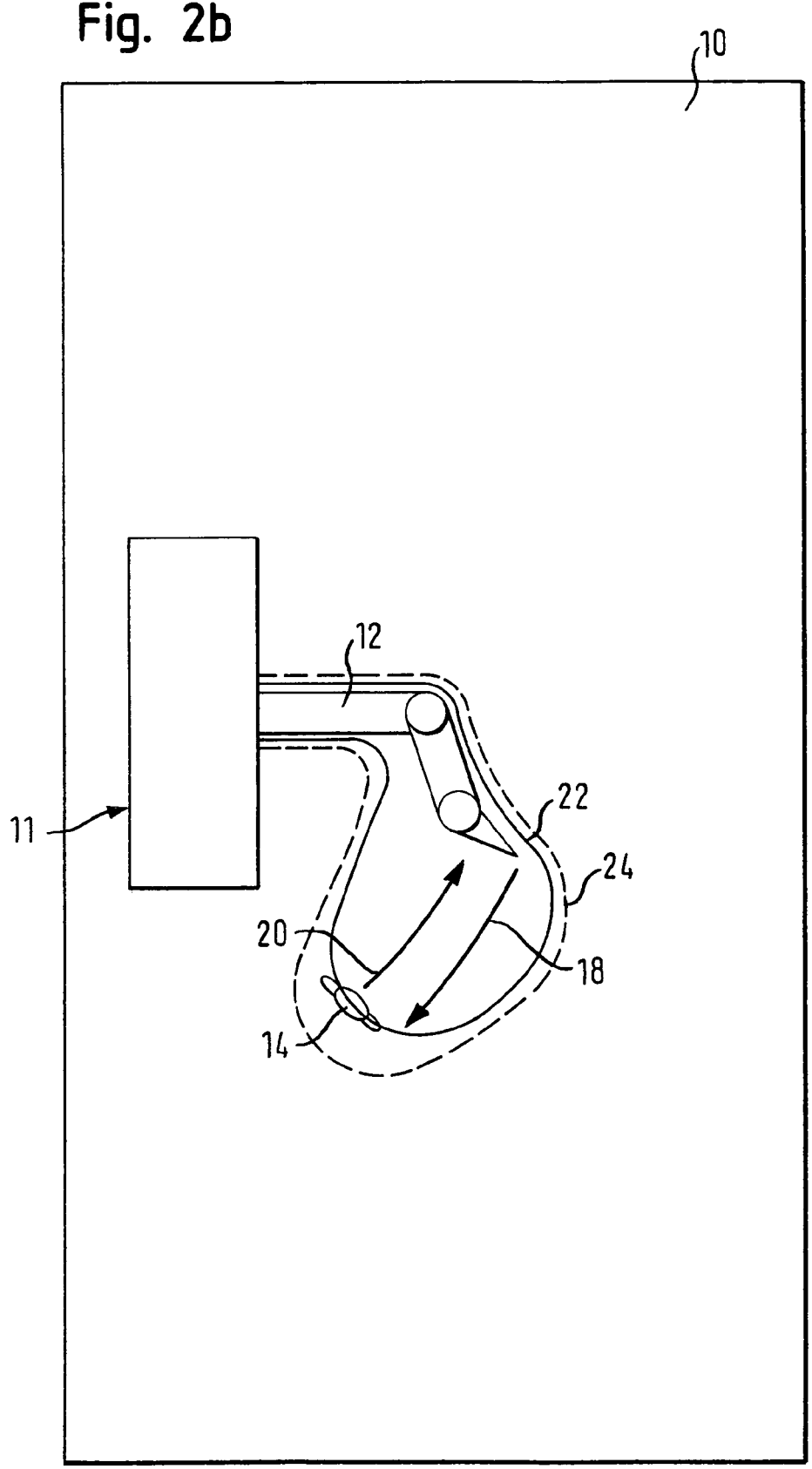

In FIG. 2b), the relative speed between the person 14 and the robot arm 12 is larger than in FIG. 2a), which is made clear by the larger length of the arrows 18 and 20. In this case, the danger zone 24 in accordance with the invention is also set larger in accordance with the higher speed so that a safety-relevant function is also reliably triggered in accordance with the invention.

FIG. 2c) shows the case that the robot arm 12 is standing still. In accordance with the prior art, a safety spacing must nevertheless be maintained between the person 14 and the robot arm 12, since a continued standstill of the robot arm 12 cannot be assumed and/or the danger zone 24 has to be set with a safety tolerance on the basis of the measuring procedure of the sensor 16. In accordance with the method of with the invention, in accordance with which the future position of the robot arm 12 of the evaluation unit is also known or can be set up reliably on the basis of the direct coupling of the machine control 19 and the evaluation unit 17 before a restarting up of the robot arm 12, the person 14 can reach up to the robot arm 12 in order, for example, to carry out maintenance work, on a longer rest phase of the robot arm 12.

FIG. 3 illustrates the meaning of the determination of the future movement of the machine as well. In FIG. 3a), the person 14 and the robot arm 12 initially move toward one another in accordance with the arrows 18 and 20. As is indicated by a further arrow 18', the movement of the robot arm 12 slows down in the further movement procedure over time. In accordance with the invention, the danger zone 22 can be correspondingly reduced by a corresponding evaluation of the future speed of movement so that the machine 11 does not have to be switched off. In accordance with the prior art, in contrast, the machine 11 would have to be switched off since the size of the danger zone 24 is not reduced.

Figure 3A:
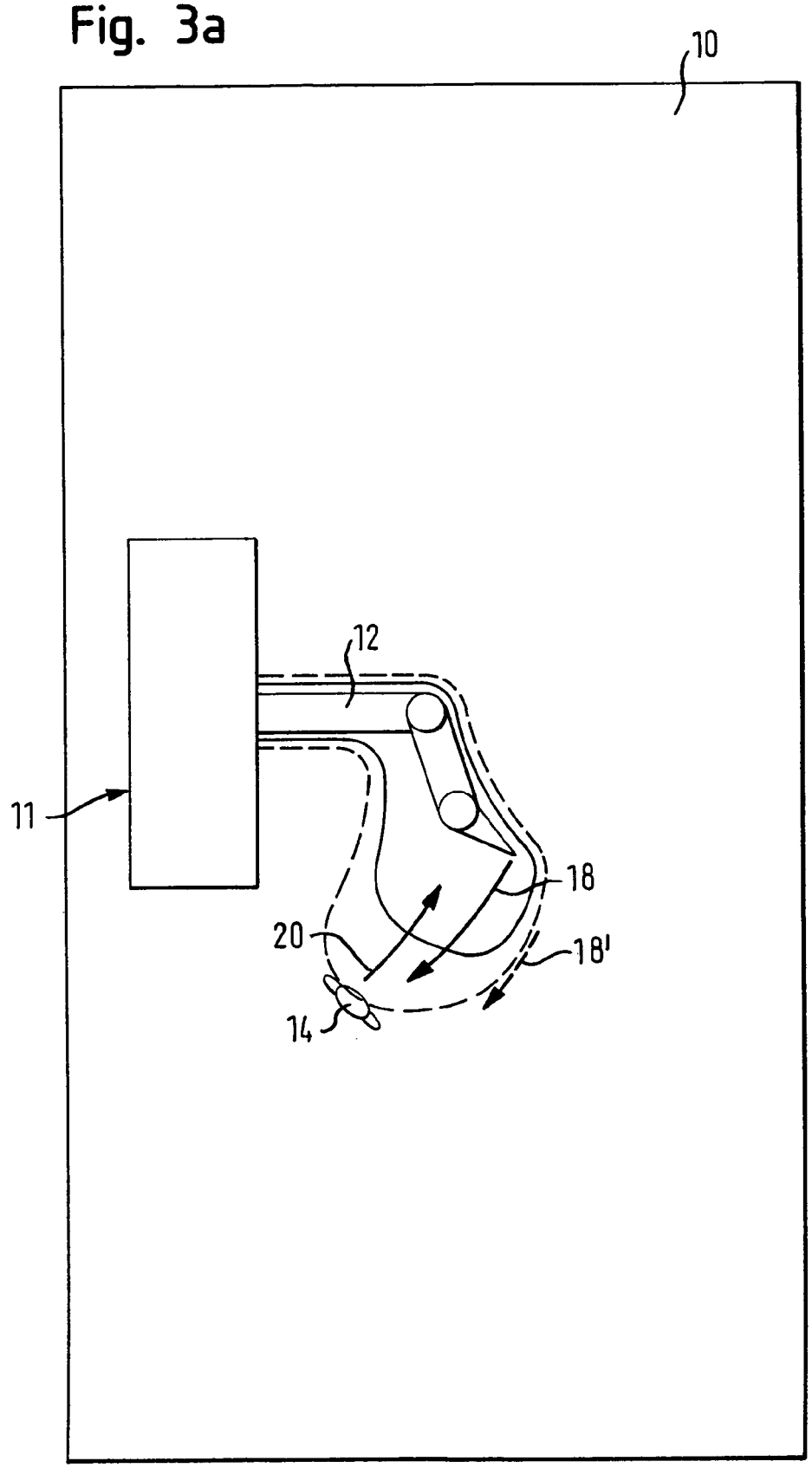
FIGS. 3a-3d are further schematic plan views of an apparatus in accordance with FIG. 1.
Figure 3B:
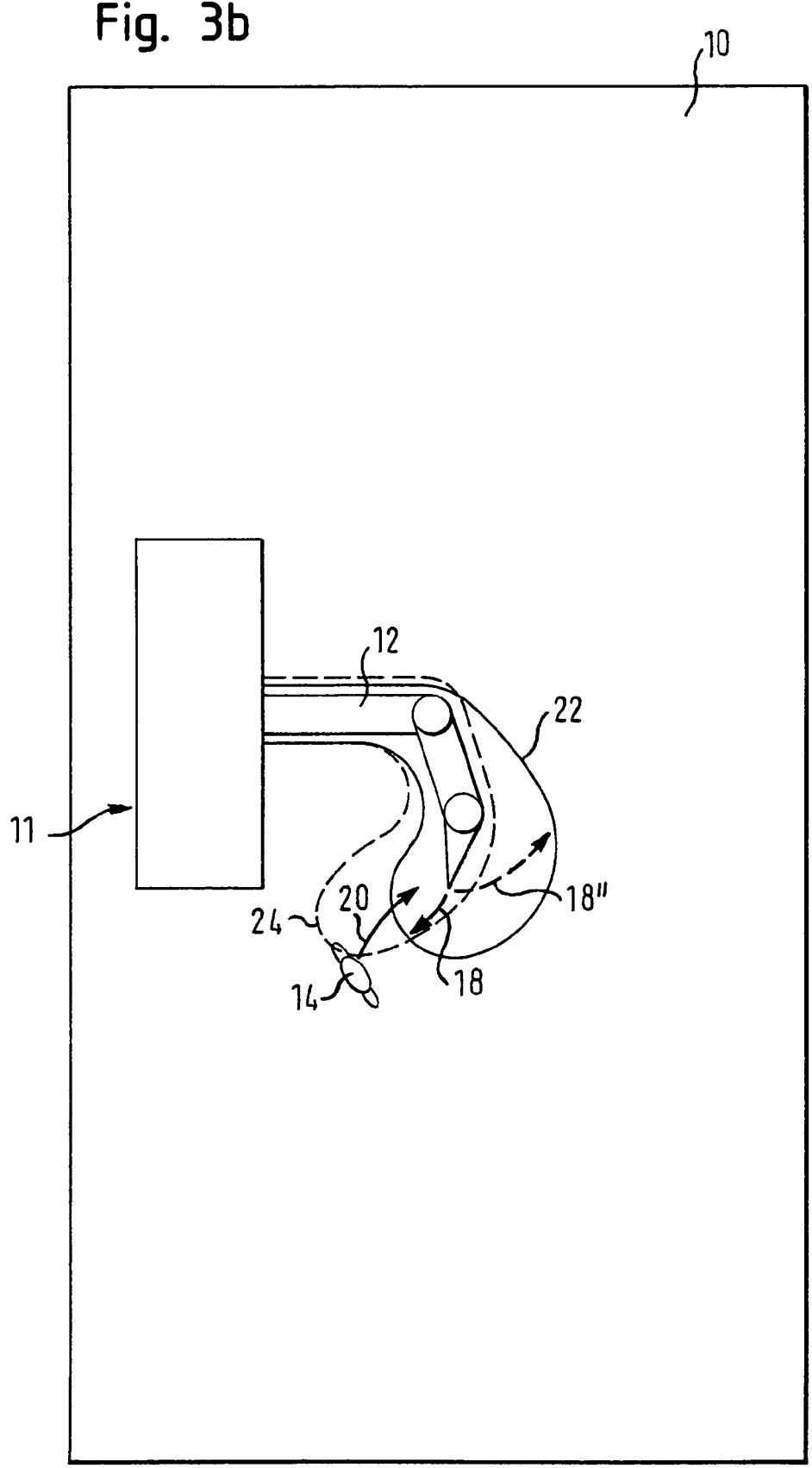

It is indicated by an arrow 18" in FIG. 3b) that the robot arm 12 is just starting to rotate, while the person 14 continues to move toward the robot arm 12. If the future position of the robot arm 12 and the future direction of movement are not evaluated, the machine 11 would again have to be switched off. This is indicated by the danger zone 24 in accordance with the prior art. In accordance with the invention, however, the size of the danger zone 22 can be matched to the future reverse movement of the robot arm 12 so that an unnecessary shutting down of the machine 11 is again prevented.

Figure 3C:
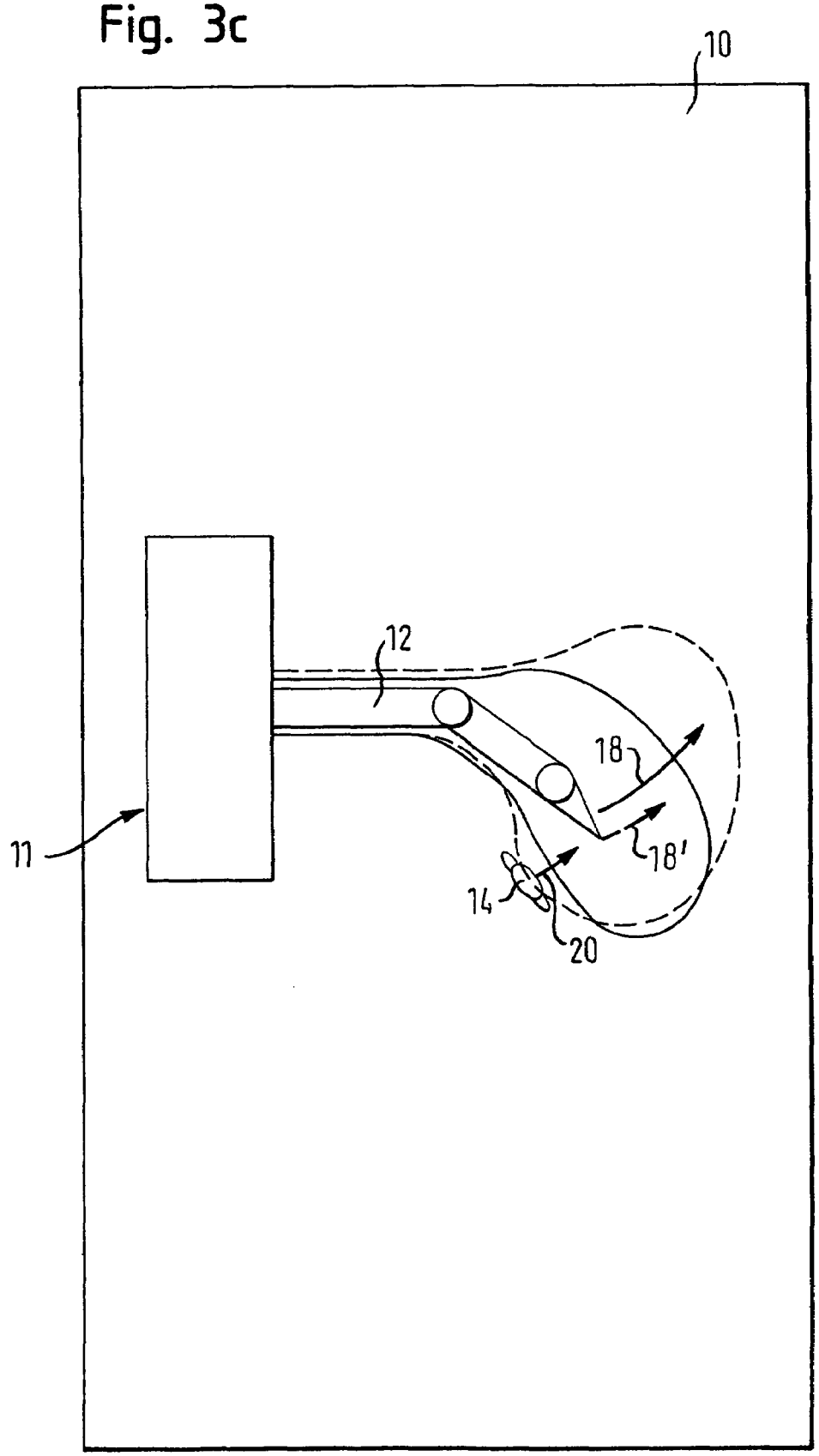

In FIG. 3c), the robot arm 12 is moving away from the person 14. A triggering of a safety-relevant function would nevertheless be necessary without knowledge of the future movement of the robot arm 12.

Figure 3D:
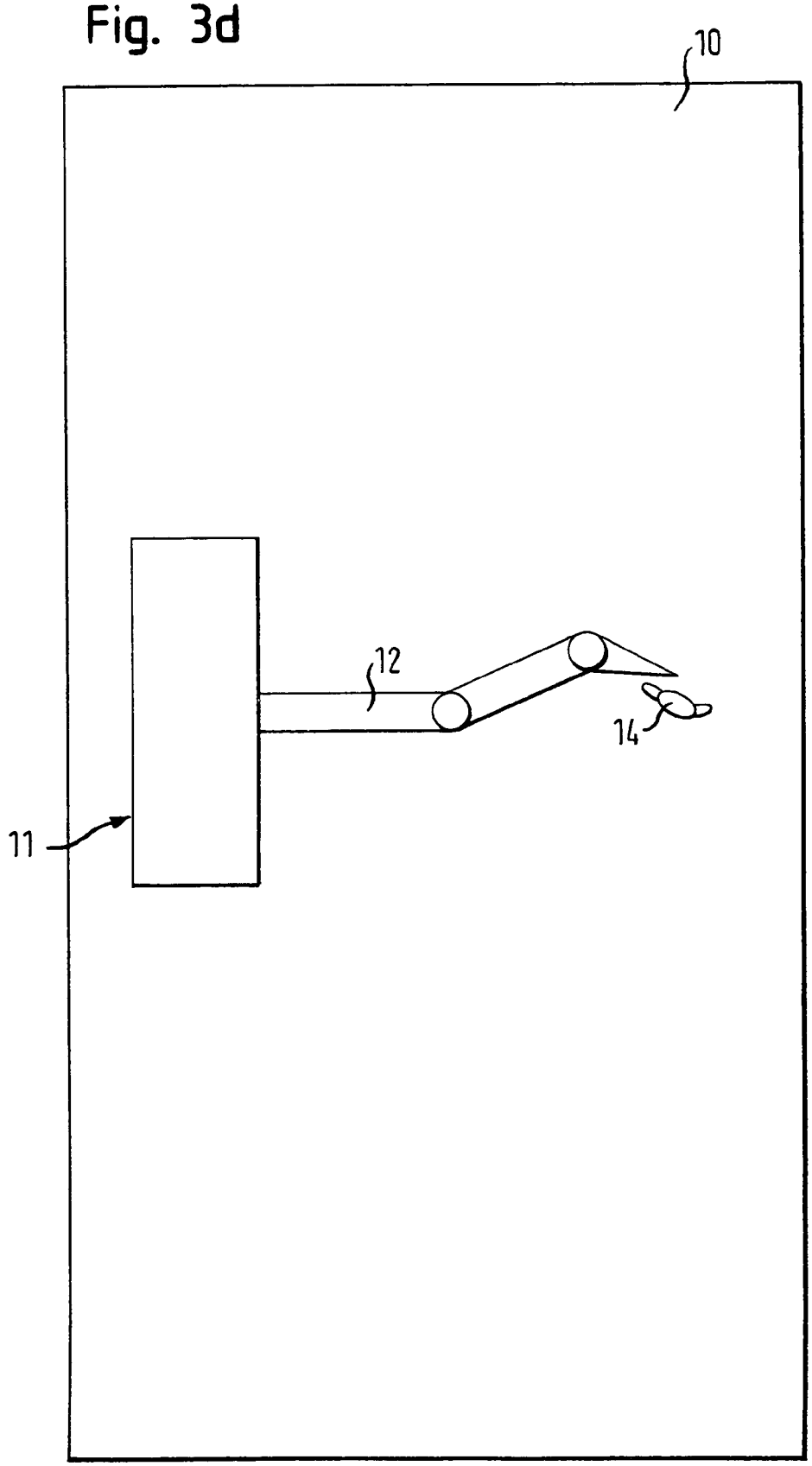

The standstill of the robot arm 12 is shown in FIG. 3d). In accordance with the invention, the danger zone 22 can be set to zero so that the person 14 can approach the robot arm 12 standing still up to a zero distance. Due to the knowledge of the future planned movement of the robot arm 12, these movements are prevented from the start so that no sudden movement of the robot arm 12 can put the person 14 at risk.

The description of the invention is merely exemplary in nature and, thus, variations that do not depart from the gist of the invention are intended to be within the scope of the invention. Such variations are not to be regarded as a departure from the spirit and scope of the invention.

REFERENCE NUMERAL LIST

10 monitored zone
11 machine
12 robot arm
14 object (person)
16 sensor
17 evaluation unit
18 movement vector of the machine
18', 18" future movement sensor of the machine
19 machine control
20 movement vector of the object
22 danger zone in accordance with the invention
24 danger zone in accordance with the prior art

What is claimed is:

1. An apparatus for the control of at least one safety-relevant function of a machine, comprising:
    a machine control that controls movements of the machine;
    at least one sensor that senses an object inside a monitored zone; and
    an evaluation unit that dynamically sets at least the size of a danger zone on the basis of control signals used by the machine control for the movement control of the machine and that triggers the safety-relevant function upon intrusion of the sensed object into the danger zone;
    wherein to enable setting of the danger zone, the evaluation unit is coupled to the machine control and wherein the evaluation unit derives parameters required for the setting of the danger zone from the control signals used by the machine control for the movement control of the machine.

2. An apparatus with claim 1, wherein the evaluation unit is coupled to the sensor for setting of the danger zone.

3. An apparatus in accordance with claim 1, wherein the sensor is spatially resolving and/or time resolving and the evaluation unit is designed for the determination of the position, of the direction of movement and/or of the speed of movement of the object.

4. An apparatus in accordance with claim 1, wherein the machine control is designed for the transmission of the instantaneous position and/or of the direction of movement and/or the speed of movement of the machine to the evaluation unit.

5. An apparatus in accordance with claim 1, wherein the machine control is designed for the transmission of the future position, in particular of the directly future position, and/or of the direction of movement and/or of the speed of movement of the machine to the evaluation unit.

6. An apparatus in accordance with claim 1, wherein the extent of the danger zone on a standstill of the machine is equal to zero.

7. An apparatus in accordance with claim 1, wherein the slowing down and/or stopping of the machine is defined as a safety relevant function.

8. An apparatus in accordance with claim 1, wherein an evasive action of the machine with respect to the object is defined as a safety relevant function.

9. An apparatus in accordance with claim 1, wherein the transmission of an acoustic and/or visual warning signal is defined as a safety-relevant function.

10. An apparatus in accordance with claim 1, wherein a plurality of objects can be monitored by the at least one sensor.

11. An apparatus in accordance with claim 1, wherein a classification of the objects sensed in the monitored zone into objects belonging to the machine and objects not belonging to the machine; and in that the safety-relevant function is not triggerable by the sensing of objects belonging to the machine.

12. A method for the control of at least one safety-relevant function of a machine, comprising:
    controlling movements of the machine via a machine control;
    sensing an object inside a monitored zone using at least one sensor;
    dynamically setting at least the size of a danger zone on the basis of control signals used by the machine control for the movement control of the machine using an evaluation unit that is coupled to the machine control to set the danger zone;
    triggering the safety-relevant function on the intrusion of the sensed object into the danger zone; and
    deriving parameters required for the step of setting the danger zone using the evaluation unit, the parameters being derived from the control signals used by the machine control for the movement control of the machine.

13. A method in accordance with claim 12, wherein the evaluation unit is coupled to the sensor to set the danger zone.

14. A method in accordance with claim 13, wherein the object is sensed in a spatially resolving and/or time resolving manner by the sensor;
    and in that the position, direction of movement and/or speed of movement of the object is determined by the evaluation unit.

15. A method in accordance with claim 12, wherein the evaluation unit processes the control signals of the machine control with respect to the instantaneous position and/or direction of movement and/or speed of movement of the machine.

16. A method in accordance with claim 12, wherein the evaluation unit processes the control signals of the machine control with respect to the future position, in particular to the directly future position, and/or the direction of movement and/or speed of movement of the machine.

17. A method in accordance with claim 12, wherein the extent of the danger zone on a standstill of the machine is equal to zero.

18. A method in accordance with claim 12, wherein the triggering of the safety-relevant function comprises the slowing down and/or stopping of the machine.

19. A method in accordance with claim 12, wherein the triggering of the safety-relevant function comprises an evasion of the machine with respect to the object.

20. A method in accordance with claim 12, wherein the triggering of the safety-relevant function comprises the transmission of a visual and/or acoustic warning signal.

21. A method in accordance with claim 12, wherein a plurality of objects are monitored simultaneously by the at least one sensor.

22. A method in accordance with claim 12, wherein the objects registered by the sensor are classified into objects belonging to the machine and into objects not belonging to the machine, so that an object belonging to the machine does not trigger the safety-relevant function.

* * * * *

UNITED STATES PATENT AND TRADEMARK OFFICE
CERTIFICATE OF CORRECTION

PATENT NO. : 7,623,031 B2  Page 1 of 1
APPLICATION NO. : 11/212935
DATED : November 24, 2009
INVENTOR(S) : Haberer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1122 days.

Signed and Sealed this

Twenty-sixth Day of October, 2010

David J. Kappos
*Director of the United States Patent and Trademark Office*